(12) United States Patent
Qiu et al.

(10) Patent No.: US 6,931,076 B2
(45) Date of Patent: Aug. 16, 2005

(54) SIGNAL DETECTOR

(75) Inventors: Sigang Qiu, Raleigh, NC (US); Wesley Smith, Raleigh, NC (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 10/334,232

(22) Filed: Dec. 31, 2002

(65) Prior Publication Data

US 2004/0125881 A1 Jul. 1, 2004

(51) Int. Cl.[7] .................. H04K 1/10; H04L 27/28
(52) U.S. Cl. ........................... 375/260; 370/526
(58) Field of Search ................. 375/260, 259, 375/316, 324, 340, 225; 370/525, 526

(56) References Cited

U.S. PATENT DOCUMENTS

| | | | | |
|---|---|---|---|---|
| 4,306,308 A | * | 12/1981 | Nossen | 375/275 |
| 4,715,029 A | * | 12/1987 | Crookshanks | 370/210 |
| 5,598,441 A | * | 1/1997 | Kroeger et al. | 375/344 |
| 5,910,906 A | * | 6/1999 | Schmitt | 708/312 |
| 6,074,086 A | * | 6/2000 | Yonge, III | 708/422 |
| 6,269,132 B1 | * | 7/2001 | Yonge, III | 375/346 |
| 6,504,870 B2 | * | 1/2003 | Srinivasan | 375/240 |

\* cited by examiner

*Primary Examiner*—Jean B. Corrielus
(74) *Attorney, Agent, or Firm*—Buckley, Maschoff & Talwalkar LLC

(57) ABSTRACT

A method, apparatus, and system for detecting a tone. In some embodiments, a signal is communicated by applying a first quantity of samples per period and a second quantity of samples per period. The samples may then be translated into information. For example, the first and second quantity of samples may be translated into information and identified. According to some embodiments, a signal communicates information at at least two different frequencies simultaneously to determine a common carrier for transmitting and receiving nodes.

37 Claims, 5 Drawing Sheets

SIGNAL DETECTOR

BACKGROUND OF THE INVENTION

In certain computer networks including, for example, the Internet, nodes communicate by way of modulated and demodulated asynchronous or synchronous signals. Those signals may be transmitted and received by, for example, modems, narrow-band communications or broadband communications such as Digital Subscriber Line ("DSL") transceivers. Those transceivers may furthermore operate under one or more common protocols such as, for example, Transmission Control Protocol and Internet Protocol ("TCP/IP"). Transceivers communicating by way of common protocols may exchange capabilities and select a common mode of operation. Such an exchange of capabilities and a selection of a common mode of operation are sometimes performed by a so-called "handshake." That handshake may be accomplished by way of a mechanism such as International Telecommunication Union Standard G.994.1 for DSL communication, for example.

After two communicating transceivers reach an agreement on a common working mode, transceivers may enter an activation phase. In the example of asymmetric digital subscriber line ("ADSL") (G.992.1, G.992.2, G.992.3 and G.992.4 standards, an activation phase may include channel discovery, training, channel analysis, and exchange. During those pre-data mode phases, transceivers may diagnose the channel characteristics, train the systems, analyze the communication channel, and communicate a set of showtime or data mode capability parameters, respectively.

BRIEF DESCRIPTION OF THE DRAWINGS

The subject matter regarded as embodiments of the invention is particularly pointed out and distinctly claimed in the concluding portion of the specification. Embodiments, however, both as to organization and method of operation, together with objects, features, and advantages thereof, may best be understood by reference to the following detailed description wherein like reference numerals are employed to designate like parts or steps, when read with the accompanying drawings in which:

DETAILED DESCRIPTION OF THE INVENTION

Figure 1:
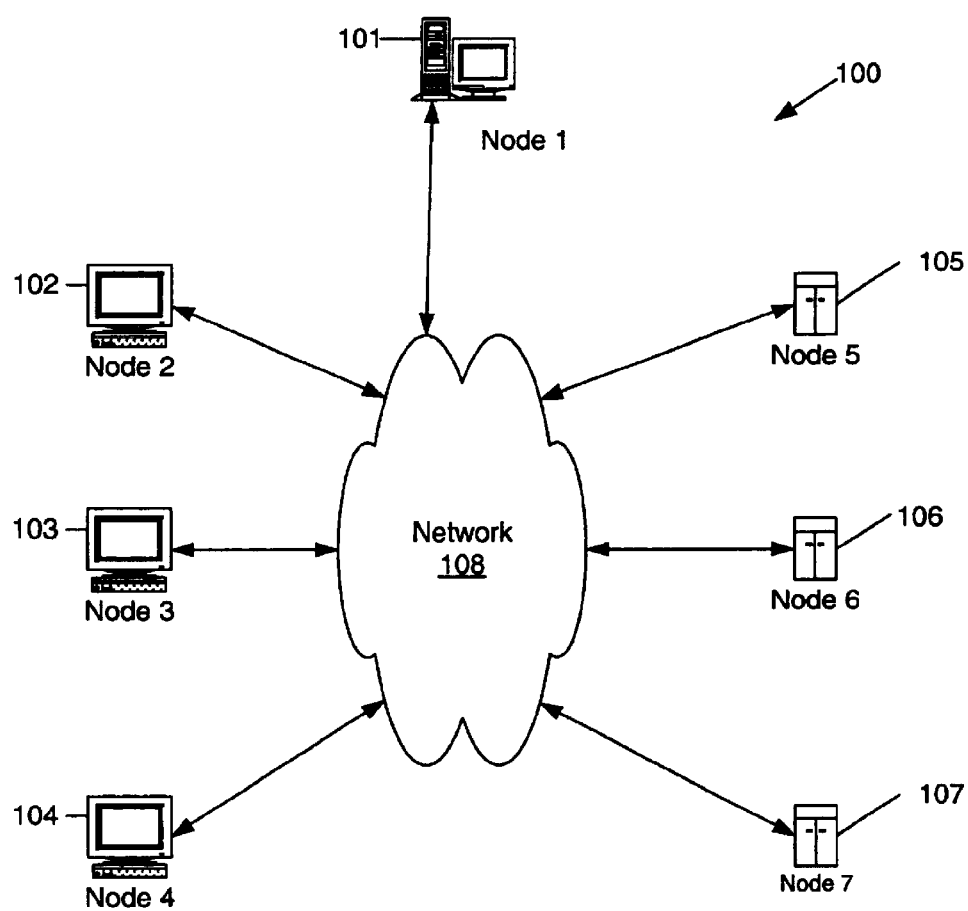
FIG. 1 is a block diagram of a system suitable for practicing an embodiment of the invention.

Reference will now be made in detail to the preferred embodiments of the present tone detection invention, examples of which are illustrated in the accompanying drawings. It is to be understood that the Figures and descriptions of embodiments of the tone detection invention included herein illustrate and describe elements that are of particular relevance, while eliminating, for purposes of clarity, other elements found in typical computers and computer networks.

One example of tone use that may benefit by use of embodiments of the present tone detection techniques is to communicate information between telephony equipment in certain communication systems. In those telephony based communication systems, tone detection may be implemented and employed at both receivers and transmitters. A telephony card or a modem are two examples of devices that may be employed in such communication systems. When a receiver detects a tone, also known as a touch tone, the tone may be passed along to an application such as, for example, Windows Telephony API™ and then to an active call center. Issues that arise in connection with tone transmission include, for example, the tone detection capabilities of the tone receiver are not robust enough to detect tones that are imperfect, the tone transmitter being used to dial the active call center generates tones that are too short for the tone receiver to detect, and the telephony being used to dial the Active Call Center system generates touch tones that are imperfect or outside the bounds recognized by the tone receiver. Generation of tones that are too short for the tone receiver to detect is particularly common with digital phone systems that generate "blips" instead of longer tones.

Embodiments of the tone detection invention may be applied to signals other than tones. For example, the detection techniques provided herein may be utilized with REVERB, SEGUE, and MEDLEY signals. Embodiments of the tone detection techniques may also be applied to signals other than those used in the handshaking phase. For example, the channel discovery, training, channel analysis, and exchange phases may be appropriate for utilization of the tone detection techniques provided herein. Those non-handshaking phases may use COMB and ICOMB signals, all of which may be compatible with embodiments of the tone detection techniques provided herein. Definitions for the COMB, ICOMB, REVERB, SEGUE and MEDLEY signals may be found in the ITU standards G.992.3. Thus, there may be a need for a simple, cost effective signal and tone detector. There may also be a need for a robust, stable tone detector.

The tone detection techniques described herein provide solutions to the shortcomings of certain communication systems. Those of ordinary skill in communication system technology will readily appreciate that the tone detection techniques, while described in connection with DSL communication, are equally applicable to other communication systems. Other details, features, and advantages of the tone detection techniques will become further apparent in the following detailed description of the embodiments.

Any reference in the specification to "one embodiment," "a certain embodiment," or a similar reference to an embodiment is intended to indicate that a particular feature, structure, or characteristic described in connection with the embodiment is included in at least one embodiment of the invention. The appearances of such terms in various places in the specification are not necessarily all referring to the same embodiment. References to "or" are furthermore intended as inclusive so "or" may indicate one or the other ored terms or more than one ored term.

The Internet is a network of nodes such as computers, dumb terminals, or other typically processor-based, devices interconnected by one or more forms of communication media. Typical interconnected devices range from handheld computers and notebook PCs to high-end mainframe and supercomputers. The communication media coupling those devices include twisted pair, co-axial cable, optical fibers and wireless communication techniques such as use of radio frequency.

A node is any device coupled to the network including, for example, routers, switches, servers, and clients. Nodes may be equipped with hardware, software or firmware used to communicate information over the network in accordance with one or more protocols. A protocol may comprise a set of instructions by which the information signals are communicated over a communications medium. Protocols are, furthermore, often layered over one another to form something called a "protocol stack."

In one embodiment, for example, the network nodes operate in accordance with a seven layer Open Systems Interconnect ("OSI") architecture. The OSI architecture includes (1) a physical layer, (2) a data link layer, (3) a network layer, (4) a transport layer, (5) a session layer, (6) a presentation layer, and (7) an application layer. The physical layer is concerned with electrical and mechanical connections to the network and may, for example, be performed by a token ring or bus. The data link layer arranges data into frames to be sent on the physical layer and may receive frames. The data link layer may receive acknowledgement frames, perform error checking and re-transmit frames not correctly received.

The network layer determines routing of packets of data and may be performed by, for example, Internet Protocol (IP) as defined by IETF standard 5, RFC 791 (IP Specification), adopted in September, 1981 and available from www.ietf.org. The transport layer establishes and dissolves connections between nodes. The transport layer function is commonly performed by a packet switching protocol referred to as the Transmission Control Protocol (TCP). TCP is defined by the Internet engineering Task Force (IETF) standard 7, Request for Comment (RFC) 793, adopted in September, 1981 (TCP Specification). The network and transport layers are often referred to collectively as "TCP/IP."

The session layer establishes a connection between processes on different nodes and handles security and creation of the session. The presentation layer performs functions such as data compression and format conversion to facilitate systems operating in different nodes. The application layer is concerned with a user view of network data, for example, formatting electronic messages.

Nodes may operate as source nodes, destination nodes, intermediate nodes or a combination of those source nodes, destination nodes, and intermediate nodes. Information is passed from source nodes to destination nodes, often through one or more intermediate nodes. Information may comprise any data capable of being represented as a signal, such as an electrical signal, optical signal, acoustical signal and so forth. Examples of information in this context may include data to be utilized by the node in which the data resides, data to be transferred to another node and utilized therein, and so forth.

Embodiments of the tone detection invention may be applied to nodes communicating by way of communications mediums such as, for example, modems, voice-band, or broadband communication mediums. Certain examples provided herein describe embodiments wherein nodes communicate by way of DSL as an example. In communications, the term "baud" is used to represent unique line conditions. Each unique line condition is referred to as a symbol. In certain systems, one bit is sent in conjunction with each symbol, while in other systems multiple bits are sent in conjunction with each symbol. For example, Quadrature Amplitude Modulation ("QAM") may utilize phase shifts and amplitude to permit the transmission of a number of bits per symbol. A plurality of samples are transmitted and received to create or read a signal that represents each symbol. Embodiments of the present invention may be applied to either single or multiple bit transmissions per symbol. Bit transmission is typically expressed in bps, or bits per second.

Communication over a communication media may be performed synchronously or asynchronously. In asynchronous and synchronous communication systems, tones and other signals are often used to communicate information between transmitting and receiving nodes. That information might include state information regarding changes of state from one signal state to another signal state. For example, a state of a tone-signal may change a state of REVERB-signal state and vice versa.

Various compatibility issues exist within standards such as ADSL. Therefore, prior to commencement of the data mode, one or more handshaking or other preliminary modes may be performed to assure that transmitting and receiving nodes are compatible, for example, regarding spectrum compatibility and speed of communication. Embodiments of the tone detection techniques may be particularly useful during pre-data mode operation to efficiently synchronize transmitting and receiving nodes.

A synchronizing device may include an analog front end ("AFE") that may be used to transmit data across an analog medium, may receive such data, and may be used for clock correction. The AFE may include an analog front end clock ("AFE clock"). The AFE may also include a digital to analog converter ("DAC") and a transmit circuit for converting digital data and transmitting that data across an analog medium to another node. The AFE may furthermore include an analog to digital converter ("ADC") and a receive circuit for receiving and converting data from another node.

In an embodiment of the present synchronization device, an AFE may provide a sampling frequency of 4.416 MHz plus or minus a maximum permissible error. Those errors may furthermore be expressed in units of parts per million ("ppm"). The maximum permissible error for the AFE may be required to be within 50 ppm.

A digital signal processing device ("DSP") may also be utilized in tone detection. A DSP typically includes a math processor so that it may quickly perform complex operations on a signal representing a digital stream of information that is being transmitted or received. DSPs may also often be programmed to, for example, adjust a sampling rate of the signal.

FIG. 1 illustrates a tone detection system 100 in which embodiments of the present invention may be implemented. Node 1 101 may be a network server. Node 2 102, node 3 103, and node 4 104 may be general-purpose computers or client processors. Node 5 105, node 6 106, and node 7 107 may be network routers or switches. Any of those nodes 101–107 may include an implementation of an embodiment of the tone detection techniques. The nodes 101–107 illustrated in FIG. 1 are coupled to a network 108 and may communicate therewith. Internodal communication may be achieved utilizing DSL or another communication medium.

Figure 2:
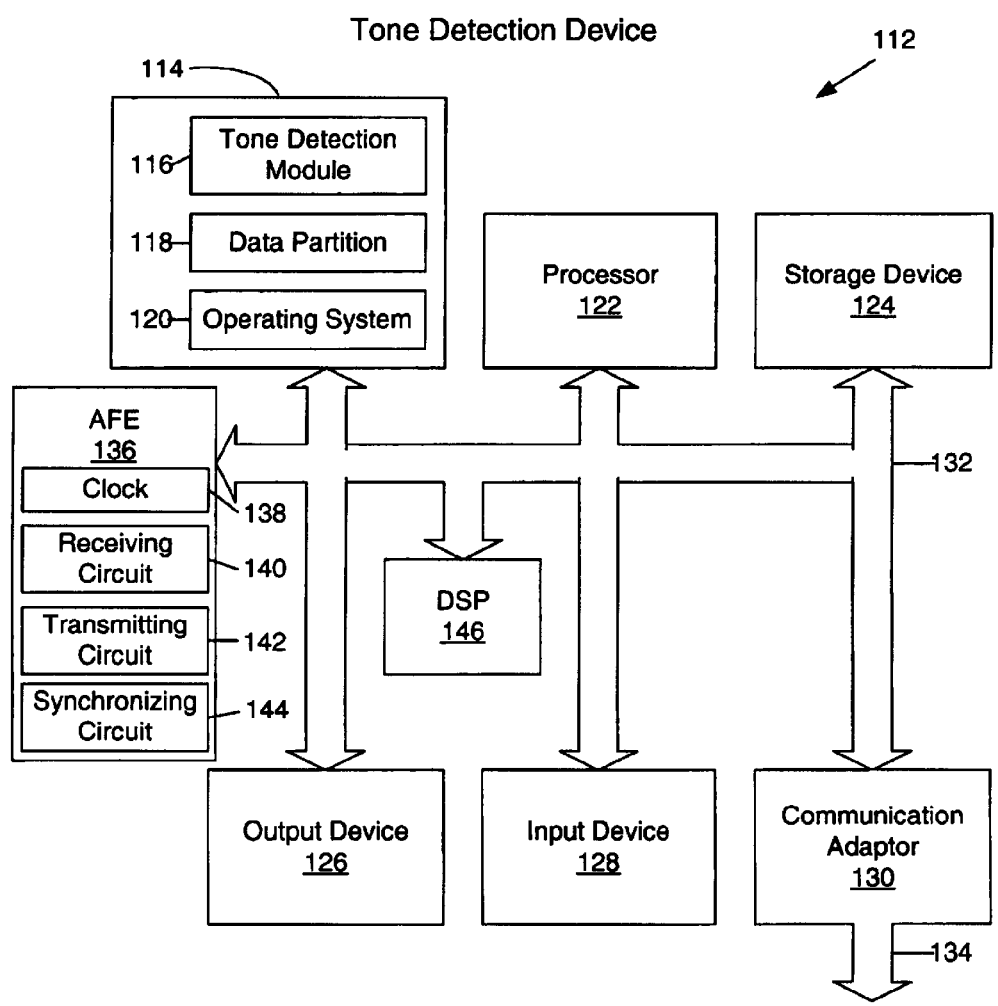
FIG. 2 is a block diagram of a device suitable for practicing an embodiment of the invention.

FIG. 2 illustrates a tone detection device 112 in an embodiment in which tone detection is performed at a node. That tone detection device 112 includes memory 114, a processor 122, a storage device 124, an output device 126, an input device 128, a communication adaptor 130, an analog front end 136 and a digital signal processor 146. Communication between the processor 122, the storage device 124, the output device 126, the input device 128, and the communication adaptor 130 may be accomplished by way of one or more communication busses 132. It should be recognized that the tone detection device 112 may have fewer components or more components than shown in FIG. 2. For example, if a user interface is not desired, the input device 128 or output device 126 may not be included with the tone detection device 112.

The memory 114 may, for example, include random access memory (RAM), dynamic RAM, and/or read only memory (ROM) (e.g., programmable ROM, erasable programmable ROM, or electronically erasable programmable ROM) and may store computer program instructions and information. The memory 114 may furthermore be partitioned into sections in which operating system 120 instructions are stored, a data partition 118 in which data is stored, and a tone detection module 116 partition in which instructions for tone detection may be stored. The tone detection module 116 partition may also allow execution by the processor 122 of the program instructions to detect tones communicated between one or more nodes 101–107. The data partition 118 may furthermore store data to be used during the execution of the program instructions such as, for example, tone processing calculations.

The processor 122 may, for example, be an Intel® Pentium® type processor or another processor manufactured by, for example Motorola®, Compaq®, AMD®, or Sun Microsystems®. The processor 122 may furthermore execute the program instructions and process the data stored in the memory 114. In one embodiment, the instructions are stored in memory 114 in a compressed and/or encrypted format. As used herein the phrase, "executed by a processor" is intended to encompass instructions stored in a compressed and/or encrypted format, as well as instructions that may be compiled or installed by an installer before being executed by the processor.

The storage device 124 may, for example, be a magnetic disk (e.g., floppy disk and hard drive), optical disk (e.g., CD-ROM) or any other device or signal that can store digital information. The communication adaptor 130 may permit communication between the tone detection device 112 and other devices or nodes coupled to the communication adaptor 130 at the communication adaptor port 134. The communication adaptor 130 may be a DSL or other type of network interface that transfers information from nodes on a network to the tone detection device 112 or from the tone detection device 112 to nodes on the network. The network may be a local or wide area network, such as, for example, the Internet, the World Wide Web, or the tone detection system 100 illustrated in FIG. 1. It will be recognized that the tone detection device 112 may alternately or in addition be coupled directly to one or more other devices through one or more input/output adaptors (not shown).

The tone detection device 112 may also be coupled to one or more output devices 126 such as, for example, a monitor or printer, and one or more input devices 128 such as, for example, a keyboard or mouse. It will be recognized, however, that the tone detection device 112 does not necessarily need to have an input device 128 or an output device 126 to operate. Moreover, the storage device 124 may also not be necessary for operation of the tone detection device 112.

The analog front end 136 may include a clock 138, a receive circuit 140, a transmit circuit 142, and a synchronization circuit 144. The digital signal processor 146 may receive samples from the AFE and include a Fourier transform module and a tone detector.

The elements 114, 122, 124, 126, 128, and 130 of the tone detection device 112 may communicate by way of one or more communication busses 132. Those busses 132 may include, for example, a system bus, a peripheral component interface bus, and an industry standard architecture bus.

The present tone detection techniques provide reliable, robust, cost effective tone detection. Reliable tone detection results from the ability of the techniques to minimize loss of signal. Robust tone detection results from the ability of the techniques to detect tones at a fast rate. Cost effective tone detection results from the ability of the tone detection techniques to reduce design costs. The present tone detection techniques provide those benefits both in relation to single tone and multi-tone detection. The techniques can also be used for other signal detections.

Embodiments of the tone detection invention utilize a number of samples received or transmitted per signal that minimizes sample processing load while maximizing the reliability and robustness of tone detection.

In an embodiment of the present signal detection invention, a method of signal detection is provided. That method includes communicating the signal by applying a first quantity of samples per period, communicating the signal by applying a second quantity of samples per period, and translating the samples into communicated signal information. The signal may include a representation of one or more tones that in turn represent information. The period may be the time required to communicate a symbol.

Translating the samples may include translating the first quantity of samples into information carried on the signal, translating the second quantity of samples into information carried on the signal, and identifying information translated from one of the first quantity of signals, the second quantity of signals, and the first and second quantities of signals. Those quantities of signals may, furthermore, be predetermined by, for example, experimentation.

That embodiment is able to detect multiple tones to determine a common communication capability. Thus, communication may be commenced utilizing a mode that is common to each node such as, for example, the A4, A43, B43, and C43 carriers.

Signal processing devices are also contemplated. A transmitting device includes a signal transmitting circuit and a digital signal processor detecting a tone utilizing a sample block of a first window size and utilizing a sample block of a second window size. A receiving device includes a signal receiving circuit and a digital signal processor detecting a tone utilizing a sample block of a first window size and utilizing a sample block of a second window size. The signal receiving and transmitting circuits may include analog front ends.

An article of manufacture is also contemplated. That article of manufacture includes a computer readable medium having stored thereon instructions. When executed by a processor, those instructions cause the processor to communicate a signal by applying a first quantity of samples of the signal per period, communicate the signal by applying a second quantity of samples of the signal per period, and translate the samples into communication information.

Figure 3:
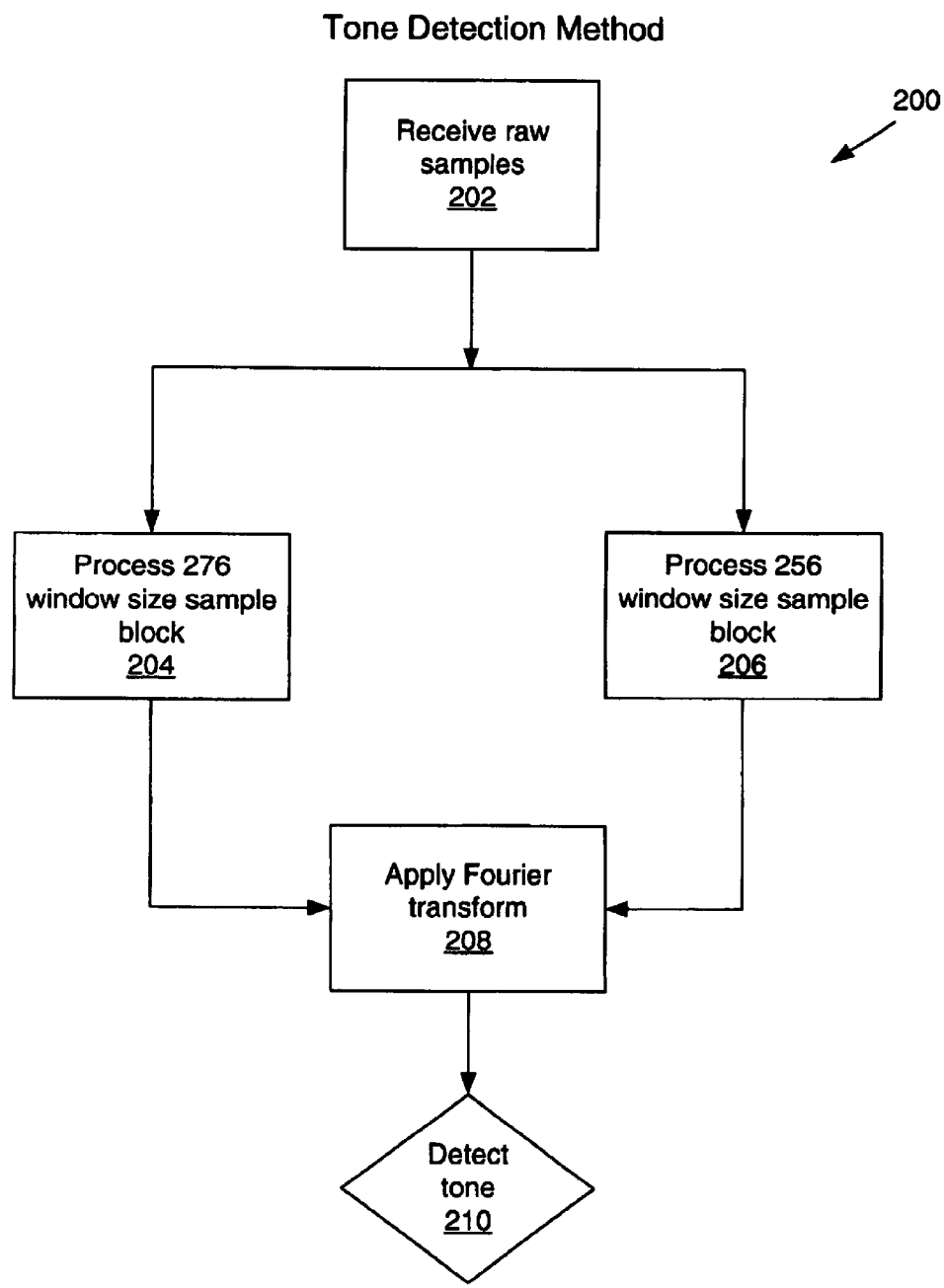
FIG. 3 is a flowchart depicting a tone detection method suitable for practicing an embodiment of the invention.

FIG. 3 illustrates a method of tone detection 200 that detects one or more tones carried in one or more signals. The method includes receiving raw samples at 202, processing an appropriate number of samples per period at 204 and 206, processing those samples utilizing a Fourier transform at 208, and detecting one or more tones present in the signal carrying the block of samples at 210. The period may, for example, be the period during which a symbol is transmitted or received. The Fourier transform may furthermore be, for example, a discrete Fourier transform ("DFT") or fast Fourier transform ("FFT"), Embodiments of tone detection systems, apparatuses, and methods will be described in connection with the ITU G.994.1 standard. It should be recognized that the tone detection systems, apparatuses, and methods could be utilized in connection with other communication systems. The G.994.1 standard utilizes tones transmitted and received at varying frequencies to accomplish a handshake. A handshake may, in turn, communicate transmitting and receiving node capabilities so that those nodes can exchange or communicate information in a commonly compatible way.

To accomplish that handshake, signals may be communicated between nodes on a network, such as the network illustrated in FIG. 1. That DSL handshake may be communicated across an analog public switched telephone network ("PSTN") by way of tones, represented by sine waves with frequencies defined by carrier sets. Currently, DSL carrier sets include A43, B43, C43, and A4 carrier sets. Those carrier sets each have one or more upstream and downstream carriers. For example, in the A43 carrier set, downstream carriers with carrier indices of 40, 56 and 64 are currently used. The frequency of each downstream carrier may be found by multiplying the downstream carrier by the signalling family frequency of which it is a part. Thus, communication on the A43 carrier set may be performed at frequencies of 40 times 4.3125 kHz, or 172.5 kHz; 56 times 4.3125 kHz, or 241.5 kHz; and 64 times 4.3125 kHz, and 276.0 kHz. Upstream carrier frequencies may be specified in each carrier set. At least one other carrier set has been proposed, and it is expected that embodiments of tone detection provided herein will be applicable to other carrier sets as well.

The A43, B43, and C43 carrier sets are used principally with ADSL in different parts of the world, with A43 used primarily in North America, B43 used primarily in Europe, and C43 used primarily in Japan. The A4 carrier set is a member of the 4 kHz signalling family that uses a single upstream carrier and single downstream carrier. The A4 carrier set is used primarily with symmetric DSL modem types.

A carrier set consists of one or more frequencies capable of being modified to carry information by, for example, amplitude modulation, frequency modulation, phase modulation, or a combination of two or more of those forms of modulation. Amplitude is the signal strength, or signal power, and is the relative "height" of the wave. Frequency is the rate at which an electromagnetic waveform alternates as is usually measured in Hertz (cycles per second) and equals the number of complete cycles occurring in one second. Phase is the relationship between a signal and its horizontal axis, also called the zero access point. A full signal cycle describes a 360° arc. Embodiments of the tone detection techniques may be used with phase modulation, as described in connection with the G.994.1 standard, or other modulation based techniques.

The carrier set in DSL, for example, allows 1 bit stream to be carried on a multi-tone signal. Carrier set A43, for example, specifies three downstream frequencies of 40 times 4.3125 kHz, 56 times 4.3125 kHz, and 64 times 4.3125 kHz creating a multi-tone signal. Those tones combine to form a multi-tone signal. Information, typically in the form of bits of data, are transmitted by changing some feature of the signal (e.g., frequency, amplitude or phase of the signal), transmitting the signals by modulation from the transmitting node, and then changing the signal back by demodulation upon reception at the receiving node. Of course, similar carrier systems allow for multiple information channels to be carried by many other communication systems as well.

Characteristics of a signal transmitted or received are reflected in the samples corresponding to that signal. To identify or detect the signal transmitted or received, those samples must be processed. Naturally, processing power is required to process each of those samples of a signal, however. A large number of samples, therefore, require a large amount of processing power, thereby reducing the amount of processing power available to perform other functions. Too small of a number of samples, however, may cause the loss of signal characteristics, which may lead to improper identification of the signal. Thus, the present tone detection technique determines an optimum number of samples, for example per symbol, and utilizes that number of samples to optimize tone detection. That number of samples is also referred to as a window size herein.

A signal to be communicated across a network by way of, for example, a PSTN may be generated by a transmitting node and received by a receiving node in samples. Those samples are typically discrete portions of the signal that, in combination, form, for example, one or more amplitudes and one or more phase shifts representing one or more data streams of information. The samples are generated at the transmitting node by a sample generating device and translated into digital information by a translating device at the receiving node. Thus, signals may be communicated by way of samples at both transmitting and receiving nodes.

Embodiments of the tone detection techniques may use two or more window sizes to determine a small window size that provides effective tone detection. In those embodiments, a range of window sizes may be predetermined experimentally to determine a small window size at which robust communication, is achieved. For example, a block size of 256 or 276 samples may be used to accommodate robust communication instead of a window size of 512, 1024, or greater samples per window. Moreover, the use of small sample sizes minimizing processing requirements beneficially frees processing power that would otherwise be used to process a large number of samples so that the signal may be processed in two of more block sizes. Use of two or more block sizes furthermore achieves a double or triple or other multiple check of information communicated by way of the signal.

A Fourier transform may be utilized to process tone sample blocks as is known in the signal processing technologies. The sampling system samples the tone carrying signal at discreet intervals. The Fourier transform converts the sampled signal to a function of frequency. That frequency, in turn, may reveal the signal being carried over a set of frequencies. Thus, multiple tones from, for example, the A43, B43, C43, or A4 carriers may be transmitted or identified in the signal utilizing a Fourier transform.

The device performing the Fourier transform may be any device programmed or created to perform the Fourier transform. For example, the device may be a processor such as the DSP. The DSP or another device may seek a detector threshold and determine whether one or more tones are present in the signal.

A block size of 276 samples per symbol, utilized at 204 has been found through experimentation to provide robust tone detection in the A4 carrier and a block size of 256 samples, utilized at 206, has been through experimentation to provide robust tone detection in the A43, B43, and C43 carriers. Thus, manipulation of blocks of 276 samples or 256 samples may be desirable. At 208, a Fourier transform, such as the DFT or FFT, processes the sampled signal.

Figure 4A:
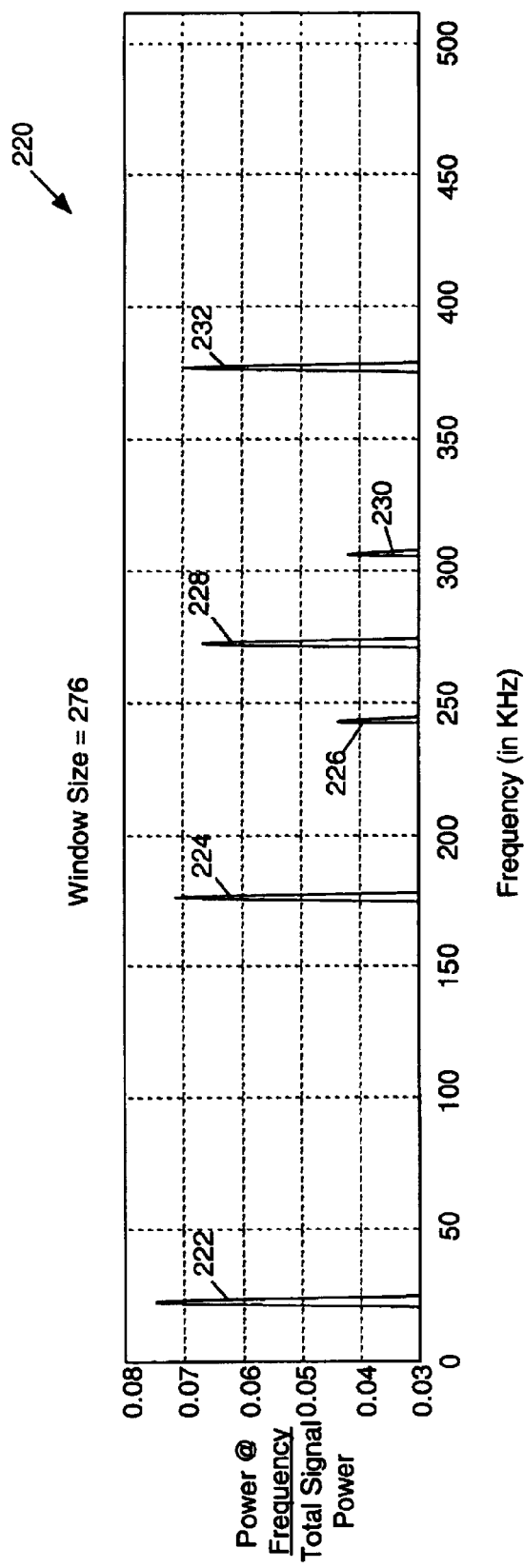
FIG. 4a is a simulated signal plot for a 276 sample window size suitable for practicing an embodiment of the invention.
Figure 4B:
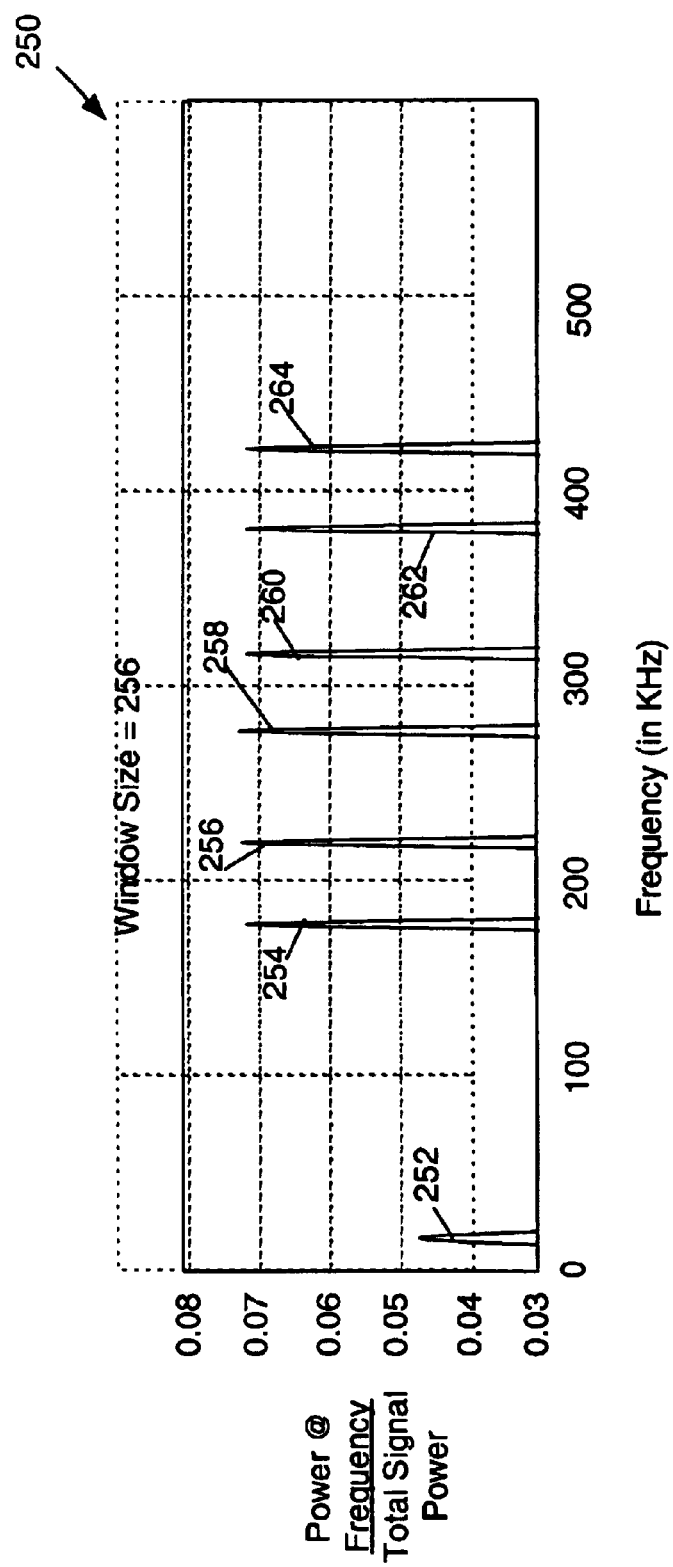
FIG. 4b is a simulated signal plot for a 256 sample window size suitable for practicing an embodiment of the invention.

FIG. 4a is a simulated signal plot 220 for a 276 sample window size and FIG. 4b is a simulated signal plot 250 for a 256 sample window size that illustrate certain advantages of embodiments of the tone detector. The signal illustrated in the simulated signal plots 220 and 250 consists of an A4 carrier, A43 carriers and B43 carriers and so includes seven different tones at 20 kHz for the A4 carrier; 172.5 kHz, 241.5 kHz, and 276.0 kHz for the A43 carrier; and 310.5 kHz, 379.5 kHz, and 414.0 kHz for the B43 carrier.

It may be seen by reference to that FIG. 4a that the 20 kHz A4 carrier tone may be easily detected utilizing the 276 sample window size. That may be seen by reference to the peek at 20 kHz 222 in the 276 sample signal plot 220. The 241.5 kHz A43 carrier tone 226 and 310.5 kHz 230 and 379.5 kHz B43 carrier tones, however, are not detected as well utilizing that 276 sample window size as they are utilizing a 256 sample window, as may be seen in FIG. 4b. The 379.5 kHz tone does not even appear in the 276 sample signal plot 220, indicating that tone is not at all well detected utilizing 276 samples per symbol. The 276 sample window, however, is excellent for detecting the 20 kHz A4 carrier.

Moreover, the 276 sample window does indicate the presence of tones with frequencies of 172.5 kHz, 241.5 kHz, and 276.0 kHz for the A43 carrier; and 310.5 kHz and 414.0 kHz for the B43 carrier at various levels. Thus, the 276 sample window may be used to double check the presence of those tones when used in combination with a 256 sample window. That helps to maximize the robustness, accuracy and reliability of the window-size adaptive tone-detection technique.

It may be seen by reference to that FIG. 4b that the 172.5 kHz 254, 241.5 kHz 256, and 276.0 kHz 258 A43 carrier frequencies and the 310.5 kHz 260, 79.5 kHz 262, and 414.0 kHz 264 B43 carrier frequencies are detected well utilizing a window size of 256 samples. The 20 kHz 252 A4 carrier frequency, however, is not detected as well as utilizing the 256 sample window size as it was detected utilizing the 276 sample window, as may be seen by the smaller 20 kHz peak 252. The 256 sample window does, however, indicate the presence of a tone with a frequency of 20 kHz. Thus, the 256 sample window may be used as a double check for detecting tones at a 20 kHz frequency when used in combination with the 276 sample window size. Thus it may be seen that a double triple or other multiple criteria based window size adaptive technique maximizes the robustness, accuracy, and reliability of tone detection.

While embodiments of the present tone detection systems, apparatuses, and methods have been described in detail and with reference to specific embodiments thereof, it will be apparent to one skilled in the art that various changes and modifications can be made therein without departing from the spirit and scope thereof. For example, embodiments of the present tone detection systems, apparatuses, and methods may be applied to communication mediums other than DSL. Thus, it is intended that embodiments of the present invention cover the modifications and variations of this invention provided they come within the scope of the appended claims and their equivalents.

What is claimed is:

1. A signal detection method, comprising:
communicating the signal by applying a first quantity of samples per period;
communicating the signal by applying a second quantity of samples per period;
translating the first quantity of samples into information carried on the signal;
translating the second quantity of samples into information carried on the signal; and
identifying information translated from one of the first quantity of signals, the second quantity of signals, and the first and second quantities of signals, wherein the signal communicates information at at least two different frequencies simultaneously to determine a common carrier for transmitting and receiving nodes.

2. The method of claim 1, wherein the signal includes a tone.

3. The method of claim 1, wherein the period is a symbol period.

4. The method of claim 1, wherein the information is represented by a tone.

5. The method of claim 1, wherein the quantity of samples received per symbol is sufficient to provide robust tone detection.

6. The method of claim 1, wherein the quantity of samples received per symbol is large enough that substantially all symbols received are accurately translated into digital information represented by those symbols.

7. The method of claim 1, wherein the first quantity of samples is 276 samples per symbol and the second quantity of samples is 256 samples per symbol.

8. The method of claim 1, wherein the first quantity of samples and the second quantity of samples are communicated simultaneously.

9. The method of claim 1, wherein said at least two frequencies are frequencies utilized in at least one of the A4, A43, B43, and C43 carriers.

10. The method of claim 1, wherein the number of samples per period is predetermined based on a communication system utilized.

11. The method of claim 1, wherein the samples are communicated on an analog communication medium.

12. The method of claim 1, wherein the samples are communicated on a digital communication medium.

13. The method of claim 1, wherein the samples are communicated on a digital subscriber line.

14. The method of claim 1, wherein the first quantity of samples per period is not equal to the second quantity of samples per period.

15. A signal processing device, comprising:
a signal receiving circuit; and
a digital signal processor to detect a signal utilizing a first quantity of samples associated with a sample block of a first window size and utilizing a second quantity of samples associated with a sample block of a second window size, wherein the digital signal processor is further to (i) translate the first and second quantity of samples into information carried on the signal and (ii) identify information translated from at least one of the first and second quantities of signals, wherein the signal communicates information at at least two different frequencies simultaneously to determine a common carrier for transmitting and receiving nodes.

16. The device of claim 15, wherein the signal receiving circuit includes an analog front end.

17. An article of manufacture comprising:
a computer readable medium having stored thereon instructions which, when executed by a processor, cause the processor to:

communicate a signal by applying a first quantity of samples of the signal per period;

communicate the signal by applying a second quantity of samples of the signal per period;

translate the first quantity of samples into information carried on the signal;

translate the second quantity of samples into information carried on the signal; and identify information translated from one of the first quantity of signals, the second quantity of signals, and the first and second quantities of signals, wherein the signl communicates information at at least two different frequencies simultaneously to determine a common carrier for transmitting and receiving nodes.

18. The article of manufacture of claim 17, wherein the period is a symbol period.

19. The article of manufacture of claim 17, wherein the first quantity of samples and the second quantity of samples are communicated simultaneously.

20. A signal detection method, comprising:

communicating the signal by applying a first quantity of samples per period;

communicating the signal by applying a second quantity of samples per period; and translating the samples into information, wherein the signal communicates information at at least two different frequencies simultaneously to determine a common carrier for transmitting and receiving nodes.

21. The method of claim 20, wherein the signal includes a tone.

22. The method of claim 20, wherein the period is a symbol period.

23. The method of claim 20, wherein the information is represented by a tone.

24. The method of claim 20, wherein the quantity of samples received per symbol is sufficient to provide robust tone detection.

25. The method of claim 20, wherein the quantity of samples received per symbol is large enough that substantially all symbols received are accurately translated into digital information represented by those symbols.

26. The method of claim 20, wherein the first quantity of samples is 276 samples per symbol and the second quantity of samples is 256 samples per symbol.

27. The method of claim 20, wherein the first quantity of samples and the second quantity of samples are communicated simultaneously.

28. The method of claim 20, wherein said at least two frequencies are frequencies utilized in at least one of the A4, A43, B43, and C43 carriers.

29. The method of claim 20, wherein the number of samples per period is predetermined based on a communication system utilized.

30. The method of claim 20, wherein the samples are communicated on an analog communication medium.

31. The method of claim 20, wherein the samples are communicated on a digital communication medium.

32. The method of claim 20, wherein the samples are communicated on a digital subscriber line.

33. The method of claim 20, wherein the first quantity of samples per period is not equal to the second quantity of samples per period.

34. A signal processing device, comprising:

a signal receiving circuit; and a digital signal processor to detect a signal utilizing a first quantity of samples associated with a sample block of a first window size and utilizing a second quantity of samples associated with a sample block of a second window size, wherein the signal communicates information at at least two different frequencies simultaneously to determine a common carrier for and receiving nodes.

35. The device of claim 34, wherein the signal receiving circuit includes an analog front end.

36. An article of manufacture comprising:

a computer readable medium having stored thereon instructions which, when executed by a processor, cause the processor to:

communicate a signal by applying a first quantity of samples of the signal per period;

communicate the signal by applying a second quantity of samples of the signal per period; and translate the samples into information, wherein the signal communicates information at at least two different frequencies simultaneously to determine a common carrier for transmitting and receiving nodes.

37. The article of manufacture of claim 36, wherein the period is a symbol period.

* * * * *